(12) United States Patent
Chen et al.

(10) Patent No.: US 7,459,862 B2
(45) Date of Patent: Dec. 2, 2008

(54) HIGH EFFICIENCY ELECTRONIC BALLAST FOR METAL HALIDE LAMP

(75) Inventors: Heping Chen, Nanping (CN); Min Chen, Nanping (CN); Qin Kong, San Diego, CA (US); Wenxiong Zhang, Nanping (CN)

(73) Assignee: Fujian Juan Kuang Yaming Electric Limited, Nanping, Fujian (CN)

( * ) Notice: Subject to any disclaimer, the term of this patent is extended or adjusted under 35 U.S.C. 154(b) by 82 days.

(21) Appl. No.: 11/715,612

(22) Filed: Mar. 7, 2007

(65) Prior Publication Data

US 2007/0222398 A1    Sep. 27, 2007

Related U.S. Application Data

(60) Provisional application No. 60/780,150, filed on Mar. 7, 2006.

(51) Int. Cl.
*H05B 37/02* (2006.01)
(52) U.S. Cl. .................. 315/224; 315/307; 315/DIG. 2
(58) Field of Classification Search ................. 315/291, 315/307, 308, 224, 209 R, DIG. 2, DIG. 4, 315/DIG. 5, 299, 300, 301, 302
See application file for complete search history.

(56) References Cited

U.S. PATENT DOCUMENTS 6,426,597 B2 * 7/2002 Rast et al. .................... 315/219
2004/0095076 A1 * 5/2004 Kastle et al. ............ 315/209 R

* cited by examiner

*Primary Examiner*—David Hung Vu
(74) *Attorney, Agent, or Firm*—Raymond Y. Chan; David and Raymond Patent Firm

(57) ABSTRACT

A high efficiency electronic ballast for large power metal halide lamp includes a power input circuit, a power factor correction circuit, a secondary power supply, a control circuit, a half bridge power converter, a resonant starting circuit, and lamp current on/off detector. The half bridge power converter has two DC block output capacitor to protect the converter when the output is shorted to ground. The operation frequency of the converter is chosen in the weak area of the acoustic resonant to avoid the acoustic resonant in the lamp. The control circuit adds a method for deep frequency and amplitude modulation and delay control function to the converter. For fine sweep pass through the output resonance point for igniting high voltage, two sweep rate control circuits are added. The metal halide lamp can be operated with very stable from starting to normal operation with high electronic ballast system efficiency.

20 Claims, 4 Drawing Sheets

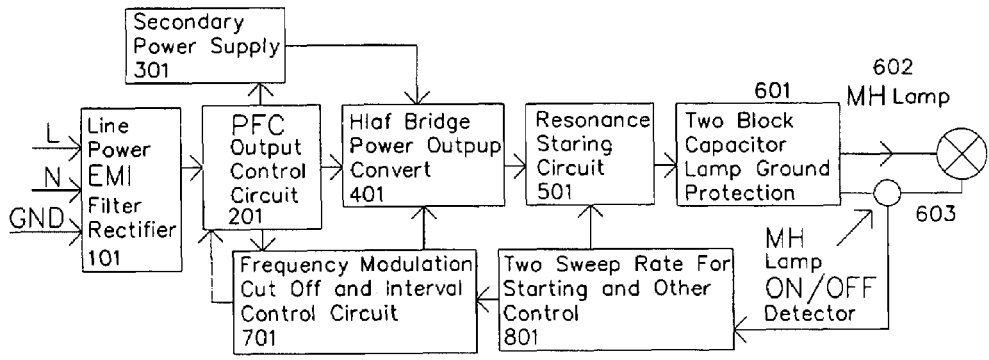

FIG.1

| LAMP POWER | ACOUSTIC RESONANCE FREQUENCY | FORMULA | CALCULATED VALUE |
|---|---|---|---|
| 250W MH L=25mm R=11mm | ACOUSTIC LONGITUDINAL FREQUENCY | $Fl := \dfrac{C}{2L}$ | 10.00khz |
| | BASIC RADIAL FREQUENCY | $Fr := \dfrac{3.83C}{2\pi R}$ | 25.398khz |
| | BASIC AZIMUTHAL | $Fa := \dfrac{1.84C}{2\pi R}$ | 12.202khz |
| 400W MH L=45mm R=19mm | ACOUSTIC LONGITUDINAL FREQUENCY | $Fl := \dfrac{C}{2L}$ | 5.556khz |
| | BASIC RADIAL FREQUENCY | $Fr := \dfrac{3.83C}{2\pi R}$ | 16.041khz |
| | BASIC AZIMUTHAL | $Fa := \dfrac{1.84C}{2\pi R}$ | 8.613khz |

Fig.2

# HIGH EFFICIENCY ELECTRONIC BALLAST FOR METAL HALIDE LAMP

CROSS REFERENCE OF RELATED APPLICATIONS

This is a non-provisional application of a provisional application having an application No. 60/780,150 and a filing date of Mar. 07, 2006.

BACKGROUND OF PRESENT INVENTION

1. Field of Invention

The present invention relates to high efficiency electronic ballast for a large power (250 W, 400 W) metal halide lamp. More specifically, the invention related to a high efficiency electronic ballast for a metal halide lamp that operates at 100 k-220 kHz (for 400 W lamp) or 180 k-300 kHz (for 250 W lamp) with different modulation at different operation period Consequence, the electronic ballast can operate the large power (250 W, 400 W) metal halide lamp very stable from starting to normal operation without the disadvantage of the complicated of low frequency with the high loss and low efficiency compare with the higher frequency operation. The efficiency of the electronic ballast is typically greater than 95%. The invention related to high efficiency electronic ballast for large power (250 W, 400 W) metal halide lamp that has two DC block output capacitor to isolate the ground and lamp leads. Therefore, the ballast is well protected when the lamp leads shorted to ground and without an isolation transformer which has low efficiency.

2. Description of Related Arts

There U.S. Pat. Nos. 5,796,216, 6,181,076, 6,936,699 disclose the ballast with an isolation output transformer. The ballasts are well protected when the output (lamp) leads are shorted to ground. The drawback is that the isolation transformer has very high transfer loss and generates a lot of heat. Therefore, the efficiency of the ballast is lower and reliability of the ballast is lower as well.

U.S. Pat. No. 6,768,274 discloses a lamp to ground fault protection circuit. This circuit checks the balance of the in and out lamp current to determine whether it is short to ground or not. During the check period, the transistor has to pass a large surge current. It will cause damage to the transistor.

U.S. Pat. No. 5,942,859 discloses the ballast with a lower frequency square wave output circuit. The circuit is quite complicated. The cost is high. The efficiency is lower.

U.S. Pat. No. 6,426,597 discloses the ballast with an improved lower frequency square wave output circuit. The overall circuit is still quite complicated. The cost is high. The efficiency is improved a little.

Some ballasts operate around 20 k-50 kHz with modulation of sine wave, triangle wave, square wave, white noise, or random code. It works with some kinds of lamps without the acoustic resonance. However, it will not work for all kind of lamps.

Other ballasts operate very high frequency which is above the acoustic resonance frequency, such as 400 kHz for 400 W and 500 kHz for 250 W. Due to the high operation frequency, the transistor loss is increased. The EMI noise is increased as well. Therefore, the ballast cost is high and the ballast lose is high as well.

With deep frequency, modulation will cause the metal halide lamp flicker in starting phase. U.S. Pat. No. 6,696,800 discloses a method to avoid flicker when MH lamp starts using deep frequency modulation. It detects MH lamp voltage to determine the modulation deep rate, it also can avoid the starting phase flicker of the MH lamp, but the drawback is the detect lamp voltage circuit cost more and is complexity.

SUMMARY OF THE PRESENT INVENTION

Traditionally, to operate the metal halide lamp without the acoustic resonance, it is either at low frequency (less than 500 Hz), such as magnetic, or high frequency (above 400 kHz for 400 W and 500 kHz for 250 W metal halide lamp).

It is an object of the invention to be able to find a stable operation frequency area which has a lower probability to cause the acoustic resonance.

For the cylindrical lamp arc chamber (with something like for the ellipse type), the basic acoustic resonance frequencies can be predicted by the following equations shown in FIG. 2. Here Fl, Fr, and Fa are basic longitudinal frequency, basic redial frequency, and azimuthal frequency respectively. C is the speed of sound valued 500 m/s. L is the height of the arc chamber. R is the radius of the cylinder. The reference 1 gives the detailed derivation. Through cursory measures of the arc tube of 250 W MH lamp and the arc tube of 400 W MH lamp, the value of the R and L can be seen in the figure. Consequently, the estimated frequencies are shown in the FIG. 2 (referenced from 0-783-8269-2104 2004 IEEE).

In fact, the acoustic resonance frequency is not a point but an area near the point.

The acoustic resonance is getting weaker when operation frequency is higher. The acoustic resonance amplitude is only 1/N time of amplitude of the fundamental acoustic resonance area.

$$\text{Aar\_n} := \frac{\text{Aar\_1}}{N}$$

where: $A_{ar\_n}$ is the amplitude of the N time harmonic of acoustic resonance.

$A_{ar\_1}$ is amplitude of the fundamental acoustic resonance area.

N stands for times of the harmonic of acoustic resonance.

When N=7 or larger, the amplitude of the acoustic resonance is quite small and weaker, and the flicker is acceptable by human eyes. Therefore, we chose 100 kHz-220 kHz for 400 W metal halide lamp and 180 kHz-300 kHz for 250 W metal halide lamp, as a sample. When the ballast operates at this frequency range, most of the metal halide lamps will operate stable. However, some of the metal halide lamps will not work well. After adding the deep (20%) frequency and amplitude modulation, the energy of the operation frequency will be distributed to wide bandwidth. Therefore, the ballast can work with almost all type metal halide lamps of 250 W and 400 W.

Unfortunately, when we use the deep (20%) modulation to stabilize the operation of HID lamps, it will cause the flickering during the starting period.

The other object of the invention is to be able to make the ballast operate stable from starting to normal operation. The object was achieved by a MCU timer-controller with a modulation control algorithm. The algorithm will control the modulation depending on the status of the operation of the ballast. When the ballast finds the lamp in starting phase, it will cut off the frequency modulation until the lamp is operating in full power status. Compared with the U.S. Pat. No. 6,696,800, it needs a circuit to detect the lamp voltage. It costs more and is more complex.

A common problem of the electronic ballast for a high intensity discharge (HID) metal halide lamp is that it is damaged by shorting the output leads to ground by accident.

Another object of the invention is to be able to short the output leads to ground without damage the ballast. It is achieved by using two DC block capacitors to isolate the lamp without an isolation transformer. The capacitor has very low impedance at operation frequency. Therefore, it will not reduce the efficiency of the ballast. The capacitor has very high impedance at low frequency (line frequency). Therefore, when the output leads short to ground (low frequency), the ballast will not be damaged.

It is an object of the invention to provide a controlled secondary power supply using a very simple circuit. This is done by adding an additional winding to the PFC boost inductor, diodes, capacitors, and voltage regulator complete the secondary power supply. This power supply provides power to the half-bridge converter. When the PFC stops, the secondary power supply turns off causing the half-bridge converter to shut off as well. This is a more efficient method of control than on traditional electronic ballast which uses a complicated status detection logic circuit. This design is simpler and lower the cost.

Still another object of the invention is to provide a two sweep rate for resonance starting circuit. With two sweep rate we can slow (fine) sweep frequency area which can be used for resonance starting the MH lamp. Refer to (801) for detail.

Another object of the invention is to provide a MH lamp on/off detector by using a current transformer (603) in series with the MH lamp. With the lamp current transformer, we can control the MH lamp in interval mode when the lamp is in failure or in hot re-strike mode.

These and other objectives, features, and advantages of the present invention will become apparent from the following detailed description, the accompanying drawings, and the appended claims.

BRIEF DESCRIPTION OF THE DRAWINGS

FIG. 1 shows the block diagram of the Efficiency Electronic Ballast for Metal Halide Lamp.

FIG. 2 shows the table of basic acoustic resonance frequency for MH400 W and MH250 W.

DETAILED DESCRIPTION OF THE PREFERRED EMBODIMENT

Figure 3:
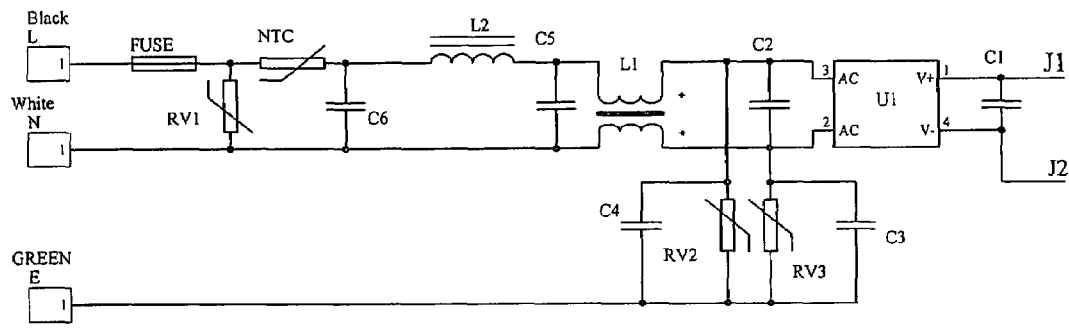
FIG. 3 shows input EMI filter and rectifier.

A high efficiency electronic ballast for large power (250 W, 400 W) metal halide lamp includes an EMI filter circuit. (101.), a. power factor correction circuit (201), a secondary power supply (301), a low frequency modulation and MCU control circuit (701), a half bridge power converter (401), a two sweep rate resonant starting circuit (801), and a lamp on/off detector (603). The half bridge power converter has the two DC block output capacitor (601) to protect the converter when the lamp output terminal is shorted to ground.

In FIG. 1 the block (101) contains the input stage of a high efficiency electronic ballast for a metal halide lamp. The detailed example is shown in FIG. 3.

L, N, E are line, neutral, and earth, respectively, for the power line input. Terminal J1, J2 connected to power factor correction part and a second control power supply. They consist of a fuse, varistor (RV1, RV2, RV3) for lighting protection, NTC for suppressive inrush line current, differential mode inductor L2, common mode inductor LI, X capacitor (C2,C5,C6), Y capacitor (C3; C4) and full bridge rectifier U1. The output of the (101) EMI filter and line power rectifier circuits are a rectified half sine wave.

Figure 4:
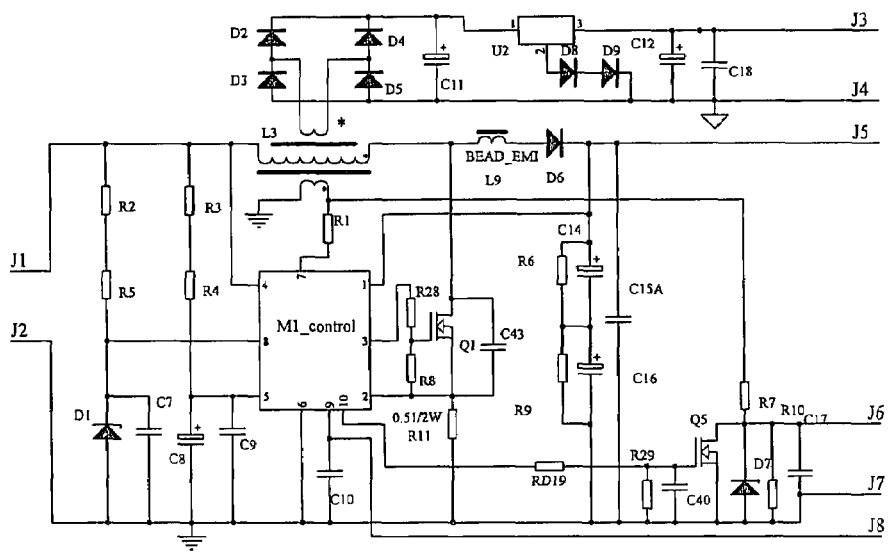
FIG. 4 shows PFC and secondary power supply.

In FIG. 1, the block (201) contains a PFC circuit, a MCU circuit, and a secondary power supply. The detailed example is shown in FIG. 4.

Terminals J1, J2 are connected to EMI filter and line power rectifier circuits (101). Terminals J3, J4 are connected to the half bridge power output circuits (401) for control circuit secondary power supply. Terminals J5, J7 are the PFC output. Terminal J6 is for low frequency modulation signal output (connected to (701)). Terminal J8 is a MH lamp abnormal status signal, where "0" indicate the lamp is "ON".

Figure 6:
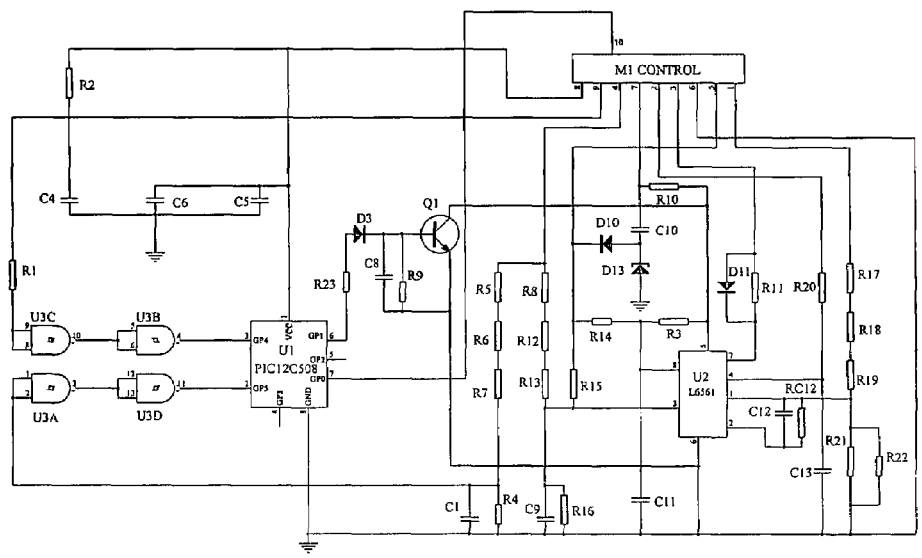
FIG. 6 shows MCU controller and detail PFC circuit.

In FIG. 1, the block (201) MCU controls all the starting function, modulation function, dip of the line voltage, low line voltage and etc. A sample of the circuit is shown in FIG. 6.

A lamp current on/off signal goes through R1, U3 into pin 3 of MCU. Pin 7 sends an output signal to Q6, R19, R29. When the lamp current is from zero to starting, MCU turns on Q6. Then the frequency modulation function is off. After 90 seconds, MCU turns off Q6. Then the frequency modulation function is on. Therefore, the lamp will not have the flickering during starting period. R4, R5, R6, R7, C1, and U3 will sense the low line voltage, dip of the line voltage and etc. The MCU will determine on/off of the PFC by send a high level voltage signal to the Q1. Q1 sets the pin 5 of PFC control IC L6561 to circuit ground. The on/off signal is coming from pin 6 of MCU and goes through R9, R23, D3, C8, and Q1.

Figure 5:
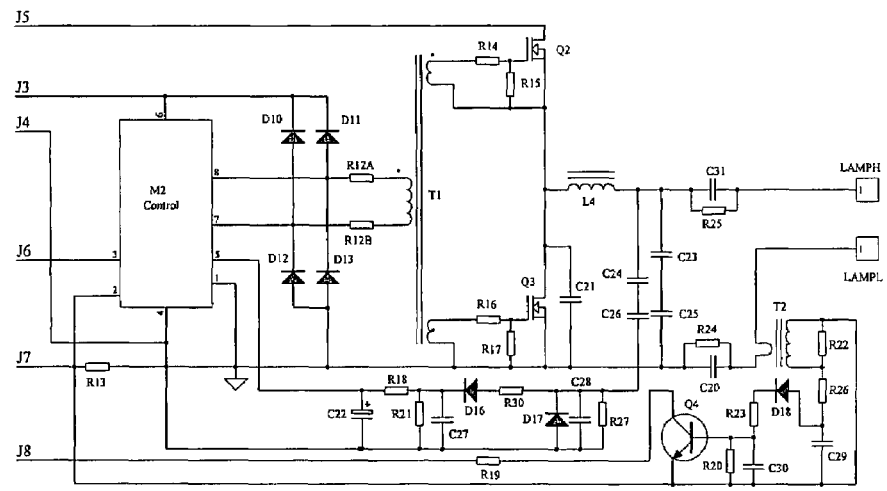
FIG. 5 shows output converter, resonant starting circuit, and lamp current detect circuit.

In FIG. 1 the block (401), (501) contains a half bridge output convener, resonant starting circuit, and lamp current detect circuit. The detailed example is shown in FIG. 5.

The power MOSFETs are driven by M2 through transformer T1. The lamp is connected by the LAMP terminals. The lamp current goes through tank circuit L4 and C23, and C25. When the driving frequency goes through the resonant frequency of the tank circuit, the tank circuit will generate a high voltage to ignite the lamp. A lamp current detection transformer T2 is placed between the lamp and the circuit ground. Therefore, this transformer will not have a very high voltage between the primary and the secondary winding during the starting period. The on/off signal is produced by R19, Q4, R20, R23. C30, D18, C29, R26, R22 and T2. Because this circuit only detects that the lamp has current or no current, the circuit is much simpler compared with the linear current detection circuit. The most important advantage of this circuit is that it dose not have a measurement error from different lamp manufactures. When using the linear current detection circuit, it will be very difficult to define threshold values for the lamp from different lamp manufactures because the lamp characters are quite different from different manufactures.

In FIG. 1, the block (601) contains an isolation circuit to protect the electronic ballast. The detailed example is shown in FIG. 5.

Components C31, C20, R24 and R25 are in the isolation circuit. The R24 and R25 are the capacitor discharge resistors. The values of these resistors are very high. The capacitor C31 is placed between one lamp lead and the half bridge converter through the tank circuit. The capacitor C20 is placed between the other lamp lead and the circuit ground. When the lamp leads are shorted to ground, there is no DC current that goes through the capacitors. Therefore, the MOSFET will not be damage. It is a very simple circuit and very efficient because there is no transformer involved.

Figure 7:
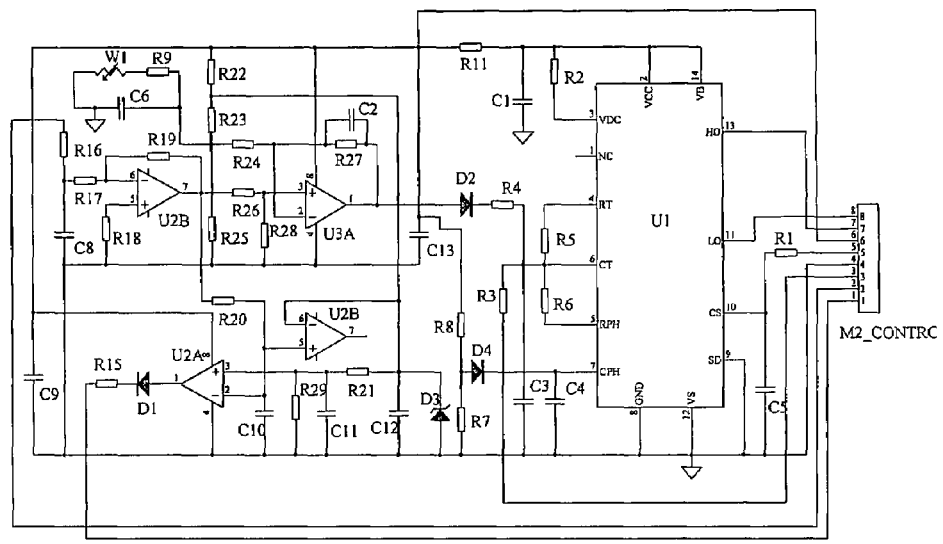
FIG. 7 shows modulation circuit.

In FIG. 1, the block (801) contains U1 and U2 and other components to generate a two sweep rate frequency. The detailed example is shown in FIG. 7 and FIG. 8.

A traditional half bridge driver IC for fluorescent lamp electronic ballasts such as IR21xx, ST L6574 and so on, all use the resonant method to get a high voltage for igniting the fluorescent lamp. These IC's have an internal frequency sweep control circuit. They all have a time period for preheating the fluorescent lamp. However, for HID lamps they do not need the pre-heat period. The HID lamp is quite different than the fluorescent lamp. The HID lamp needs a higher ignition voltage and a longer igniting time period. The fluorescent IC chip has a fixed sweep rate. It is for fluorescent lamps only. The igniting period is not long enough for some HID lamps. The half bridge driver IC (U1) Pin 7 is an output pin of an internal current source which charges the frequency sweep control capacitor C4. When the voltage of C4 is low, C4 is charged by R8 and R7 via diode D4. When the voltage of C4 is high, the D4 is cut off. Due to the selection of R8 and R7, the capacitor C4 will be charged at a fast rate at initial sweep period. After D4 goes off, then the capacitor C4 is charged by the internal current source. Then the capacitor C4 will be charged for a much slower rate. During this slow sweep period, the lamp will have a higher ignition voltage and a longer ignition time.

Figure 8:
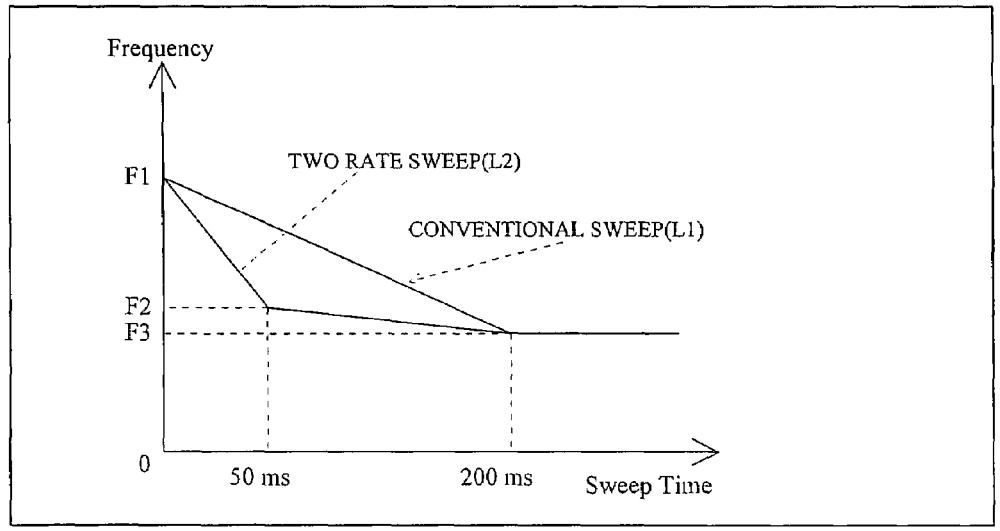
FIG. 8 shows the two rate sweep frequency for igniting high voltage.

In FIG. 8, the conventional sweep (L1) is for a fluorescent lamp. A constant sweep rate has been used for fluorescent lamp preheat and igniting. The two rate sweep (L2) is for HID lamp igniting. Since the HID lamps do not need to preheat, we can arrange the frequency F1 to F2 a fast charging rate sweep. The frequency F2 to F3 is a slow rate sweep. The frequency F2 and F3 can be chosen to cover the ignition frequency range. When the ignition frequency is between F2 and F3, the resonant frequency is exited at slow rate. Therefore, the ignition period is longer and the lamp voltage is higher.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A high efficiency electronic ballast for large power lamp, comprising:
    a power input circuit for electrically connecting with an external power,
    a control circuit electrically coupling with said power input circuit;
    a resonant starting circuit electrically coupling with said control circuit;
    a lamp current on/off detector detecting said halide lamp between a starting phase and a normal operating phase, wherein at said starting phase, a lamp current is from zero to starting, and at said normal operating phase, said lamp current becomes stable; and
    a two sweep rate control activated by said resonance starting circuit to fine sweep frequency area with two sweep rates.

2. The high efficiency electronic ballast, as recited in claim 1, wherein said control circuit comprises a MCU circuit controller with a frequency modulation control, wherein when said lamp is in said starting phase, said frequency modulation control is cut off until said lamp is operated in said normal operating phase.

3. The high efficiency electronic ballast, as recited in claim 1, further comprising a half bridge power converter having two DC block output capacitors for isolating said lamp without an isolation transformer so as to protect said converter when an output is shorted to ground, wherein each of said capacitor has very low impedance at operation frequency and very high impedance at low frequency.

4. The high efficiency electronic ballast, as recited in claim 2, further comprising a half bridge power converter having two DC block output capacitors for isolating said lamp without an isolation transformer so as to protect said converter when an output is shorted to ground, wherein each of said capacitor has very low impedance at operation frequency and very high impedance at low frequency.

5. The high efficiency electronic ballast, as recited in claim 3, wherein said operation frequency of said converter is chosen in a weak area of an acoustic resonant to avoid said acoustic resonant in the lamp.

6. The high efficiency electronic ballast, as recited in claim 4, wherein said operation frequency of said converter is chosen in a weak area of an acoustic resonant to avoid said acoustic resonant in the lamp.

7. The high efficiency electronic ballast, as recited in claim 1, wherein said control circuit comprises a power factor correction (PFC) circuit, a half-bridge power converter electrically coupling with said power factor correction circuit, and a secondary power supply providing power to said half-bridge power converter, wherein when said power factor correction circuit stops, said secondary power supply is turned off to shut off said half-bridge power converter as well.

8. The high efficiency electronic ballast, as recited in claim 4, wherein said control circuit comprises a power factor correction (PFC) circuit, a half-bridge power converter electrically coupling with said power factor correction circuit, and a secondary power supply providing power to said half-bridge power converter, wherein when said power factor correction circuit stops, said secondary power supply is turned off to shut off said half-bridge power converter as well.

9. The high efficiency electronic ballast, as recited in claim 6, wherein said control circuit comprises a power factor correction (PFC) circuit, a half-bridge power converter electrically coupling with said power factor correction circuit, and a secondary power supply providing power to said half-bridge power converter, wherein when said power factor correction circuit stops, said secondary power supply is turned off to shut off said half-bridge power converter as well.

10. The high efficiency electronic ballast, as recited in claim 1, wherein an initial sweep period of said two sweep rate control is faster than a second sweep period thereof such that during said second sweep period, said lamp has a higher ignition voltage and a longer ignition time.

11. The high efficiency electronic ballast, as recited in claim 4, wherein an initial sweep period of said two sweep rate control is faster than a second sweep period thereof such that during said second sweep period, said lamp has a higher ignition voltage and a longer ignition time.

12. The high efficiency electronic ballast, as recited in claim 6, wherein an initial sweep period of said two sweep rate control is faster than a second sweep period thereof such that during said second sweep period, said lamp has a higher ignition voltage and a longer ignition time.

13. The high efficiency electronic ballast, as recited in claim 9, wherein an initial sweep period of said two sweep rate control is faster than a second sweep period thereof such that during said second sweep period, said lamp has a higher ignition voltage and a longer ignition time.

14. The high efficiency electronic ballast, as recited in claim 1, wherein an operation frequency of said lamp has a range of 100 kHz-220 kHz for 400 W halide lamp and 180 kHz-300 kHz for 250 W halide lamp.

15. The high efficiency electronic ballast, as recited in claim 6, wherein said operation frequency of said lamp has a range of 100 kHz-220 kHz for 400 W halide lamp and 180 kHz-300 kHz for 250 W halide lamp.

16. The high efficiency electronic ballast, as recited in claim 13, wherein said operation frequency of said lamp has a range of 100 kHz-220 kHz for 400 W halide lamp and 180 kHz-300 kHz for 250 W halide lamp.

17. The high efficiency electronic ballast, as recited in claim 1, wherein said lamp current on/off detector comprises a lamp current detection transformer placed between said lamp and a circuit ground, wherein said lamp current on/off detector only detects whether said lamp has current or not.

18. The high efficiency electronic ballast, as recited in claim 6, wherein said lamp current on/off detector comprises a lamp current detection transformer placed between said lamp and a circuit ground, wherein said lamp current on/off detector only detects whether said lamp has current or not.

19. The high efficiency electronic ballast, as recited in claim 13, wherein said lamp current on/off detector comprises a lamp current detection transformer placed between said lamp and a circuit ground, wherein said lamp current on/off detector only detects whether said lamp has current or not.

20. The high efficiency electronic ballast, as recited in claim 16, wherein said lamp current on/off detector comprises a lamp current detection transformer placed between said lamp and a circuit ground, wherein said lamp current on/off detector only detects whether said lamp has current or not.

* * * * *